United States Patent [19]

Oyagi et al.

[11] Patent Number: 4,837,854
[45] Date of Patent: Jun. 6, 1989

[54] PAGING RECEIVER HAVING A NOISE-IMMUNE VERIFICATION CIRCUIT FOR DISABLING BATTERY SAVING OPERATION

[75] Inventors: Takashi Oyagi; Toshifumi Sato, both of Tokyo, Japan

[73] Assignee: Nec Corporation, Tokyo, Japan

[21] Appl. No.: 63,055

[22] Filed: Jun. 17, 1987

[30] Foreign Application Priority Data

Jun. 18, 1986 [JP] Japan .................................. 61-140305

[51] Int. Cl.$^4$ ........................ H04B 1/16; H04Q 9/14
[52] U.S. Cl. .................................. 455/343; 340/825.44
[58] Field of Search .............................. 455/343, 36; 340/825.44, 825.47, 825.48

[56] References Cited

U.S. PATENT DOCUMENTS

| | | | |
|---|---|---|---|
| 4,353,065 | 10/1982 | Mori ........................................ | 455/343 |
| 4,419,765 | 12/1983 | Wykoff et al. ......................... | 455/36 |
| 4,506,386 | 3/1985 | Ichikawa et al. .................... | 455/343 |
| 4,523,332 | 6/1985 | Mori ........................................ | 455/343 |
| 4,652,875 | 3/1987 | Waki .................................... | 340/825.44 |

*Primary Examiner*—Robert L. Griffin
*Assistant Examiner*—Ralph E. Smith

*Attorney, Agent, or Firm*—Sughrue, Mion, Zinn, Macpeak & Seas

[57] ABSTRACT

A selective calling radio paging receiver includes a battery saving controller which activates the high power drain unit of the receiver at periodic intervals for allowing the detection of a preamble contained in a received digital paging signal and deactivates it for a period longer than the period of activation for power savings purposes. The power saving is disabled in response to the detection of a preamble for continued power activation to permit a sync detector and an address detector to be operated in succession. A window pulse is generated in synchronism with the clock timing of the received digital signal so that its binary level transition is time coincident with each window pulse. If noise occurs in the received signal, binary level transitions occurs which are out of coincidence with window pulses. The time-coincident binary level transitions and the noncoincident binary level transitions are counted to give first and second counts, respectively. If a valid preamble is lost or corrupted and if the first count is greater than the second, a valid indication of the received signal will be given and power activation is continued to operate the sync and address detectors in succession.

9 Claims, 4 Drawing Sheets

PAGING RECEIVER HAVING A NOISE-IMMUNE VERIFICATION CIRCUIT FOR DISABLING BATTERY SAVING OPERATION

BACKGROUND OF THE INVENTION

The present invention relates to a selective calling radio paging receiver in which the high power drain unit is rendered active at periodic intervals for power savings purposes and more specifically to a radio paging receiver having a verification circuit that verifies the validity of a received digital signal in the event of a loss or corruption of a preamble.

In conventional battery saving radio pagers, the high power drain unit is rendered active for a duration sufficient to permit the receiver to search for a preamble that precedes a subsequent digital signal and rendered inactive for an interval much longer than the active duration if the preamble is not detected. If the preamble is detected, the battery saving operation is disabled to permit the receiver to search for a synchronization codeword to establish word synchrozniation and for a match between a received address and the user's address to energize a tone generator for alerting the user. However, if a preamble is lost or corrupted prior to the reception of a subsequent signal, the receiver recognizes it as an absence of paging signal and the subsequent signal will be lost.

A Power saving radio pager, as shown and described in U.S. Pat. No. 4,523,332 issued to T. Mori, overcomes this problem by monitoring the bit rate of a digital signal received during its short active period and verifying it as a valid signal if it has a predetermined bit rate. Specifically, the pager employs a counter for counting binary level transitions of received digital pulses and a noise detector that clears the counter to the initial value whenever a noise impulse occurs in the received bit sequence. Although the noise component must be excluded from the count if it is desired to ensure a high degree of verification, the occurrence of a single noise impulse near the end of a count sequence would nullify the count which could be used as a valid indication of a paging signal. Therefore, the prior art paging receiver is likely to be affected by noise impulses which can be tolerated for most practical applications.

SUMMARY OF THE INVENTION

It is therefore an object of the present invention to provide a selective calling radio paging receiver having a noise-immune verification circuit for disabling battery saving operation.

The noise-immune verification circuit is enabled during the active period of the receiver and includes a window pulse generator for generating a window pulse in sychronism with a recovered clock pulse so that each binary level transition of a received digital pulse is time coincident with each window pulse. If noise occurs in the received signal, binary level transitions are noncoincident with window pulses. A first count of the time-coincident binary level transitions and a second count of the noncoincident binary level transitions are taken and compared against each other for verifying the signal if the first count exceeds the second count.

Specifically, the selective calling radio paging receiver receives a digital bit stream containing a preamble followed by a series of blocks each having a synchronization codeword and a series of address codewords. A battery saving controller activates the high power drain unit of the receiver at periodic intervals. Upon the detection of a preamble by a preamble detector, the high power drain unit is continuously activated to permit a sync detector to search for a synchronization codeword, and then an address detector to search for a match between an address codeword and the user's address. First and second counters are enabled during the active period of the receiver to respectively provide the first and second counts to be compared against each other for verification of the received signal. If a preamble is lost or corrupted and if the first count is greater than the second count, the high power drain unit is continuously activated to permit the sync detector to search for a sychronization codeword, and then the address detector to search for a match between an address codeword and the user's address.

BRIEF DESCRIPTION OF THE DRAWINGS

The present invention will be described in further detail with reference to the accompanying drawings, in which.

DETAILED DESCRIPTION

Figure 1:
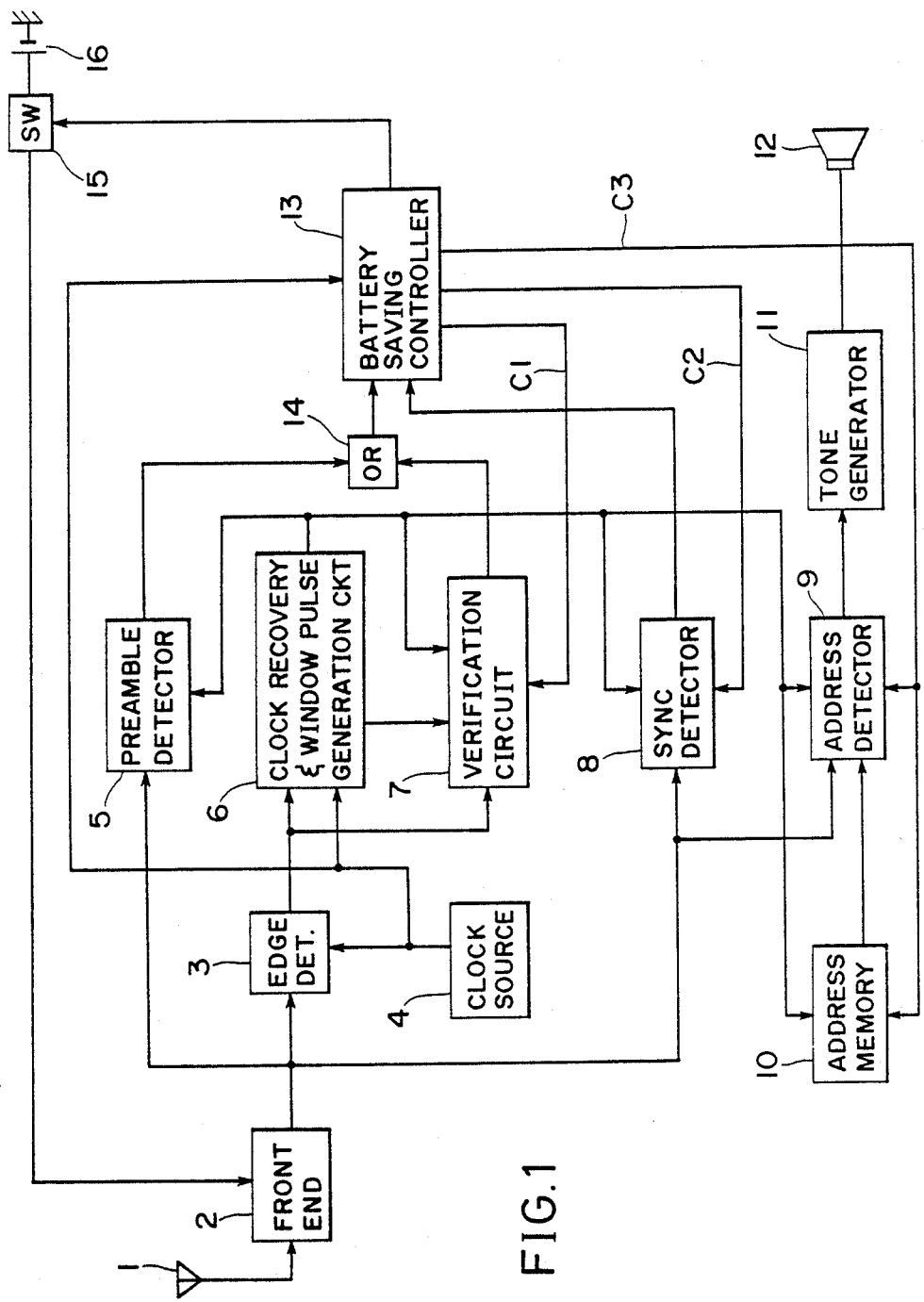
FIG. 1 is a block diagram of a power saving selective calling radio paging receiver according to a preferred embodiment of the present invention.

The selective calling radio pager of the present invention is shown in FIG. 1. The pager includes a front end, or a radio-frequency section 2 which amplifies and demodulates a digitally modulated paging signal received by antenna 1 and applies the demodulated digital pulse signal to an edge detector 3, a preamble detector 5, a sync detector 8 and an address detector 9. A transition pulse is generated at the output of edge detector 3 in response to each of the leading and trailing edge transitions of each digital pulse and fed to a clock recovery and window pulse generation circuit 6 and a verification circuit 7. Clock recovery and window pulse generation circuit 6 recovers clock timing from the incoming bit stream and supplies recovered clock pulses to the preamble detector 5, verification circuit 7, sync detector 8 and address detector 9 and further to an address memory 10.

The paging signal is a code sequence preferably formatted according to the standards specified by The British Post Office Code Standardisation Advisory Group (know as POCSAG) and transmitted from a central calling station. Each transmission starts with a preamble to permit the pager to attain bit synchronization and to prepare it to acquire word synchrozation. The preamble is a pattern of reversals of binary 1's and 0's for a period of 576 bits. Cordwords are transmitted in batches each of which comprises a synchronization codeword to permit the pager to establish word sychronization, the sychronization codeword being followed by eight frames each containing 2 codewords of 32 bits each. The frames are numbered 0 to 7 and the pager population is similarly divided into 8 groups. Each pager is allocated to one of the 8 frames in which an address codeword of the pager is transmitted. In the absence of an address codeword, an idle codeword is transmitted.

A battery saving controller 13, which is essentially constructed of a counter and logic circuit in a well known manner, is responsive to clock pulses from clock source 4 to normally generate a periodic power control pulse having a period of 32 bits of the incoming signal (equivalent to the duration of each codeword) at sychronization intervals. This power control pulse activates a power switch 15 to feed power from battery 16 to the high power drain unit, i.e., the front end 2. The radio pager is thus periodically rendered active for the duration of a codeword to permit the preamble detector 5 to detect a preamble and reamains inactive for a period of 15 codewords for power saving purposes. If a preamble is detected, the preamble detector 5 produces an output which is applied through an OR gate 14 to the battery saving controller 13. On the other hand, the verification circuit 7 cooperates with the clock recovery and window pulse generation circuit 6 to determine whether the incoming signal is valid. If it is, the verification cicuit 7 supplies an output through OR gate 14 to the battery saving controller 13. In response to a signal from OR gate 14, the battery saving controller 13 enables the sync detector 8 to search for a sychronization codeword, and whereupon the address detector 9 is allowed to search for a match between a received address codeword and a user's unique codeword stored in the address memory 10, which is implemented by a programmable read-only memory. If there is a match, the address detector 9 will cause a tone generator 11 to drive a loudspeaker 12 to alert the user of the reception of a paging signal.

Figure 2:
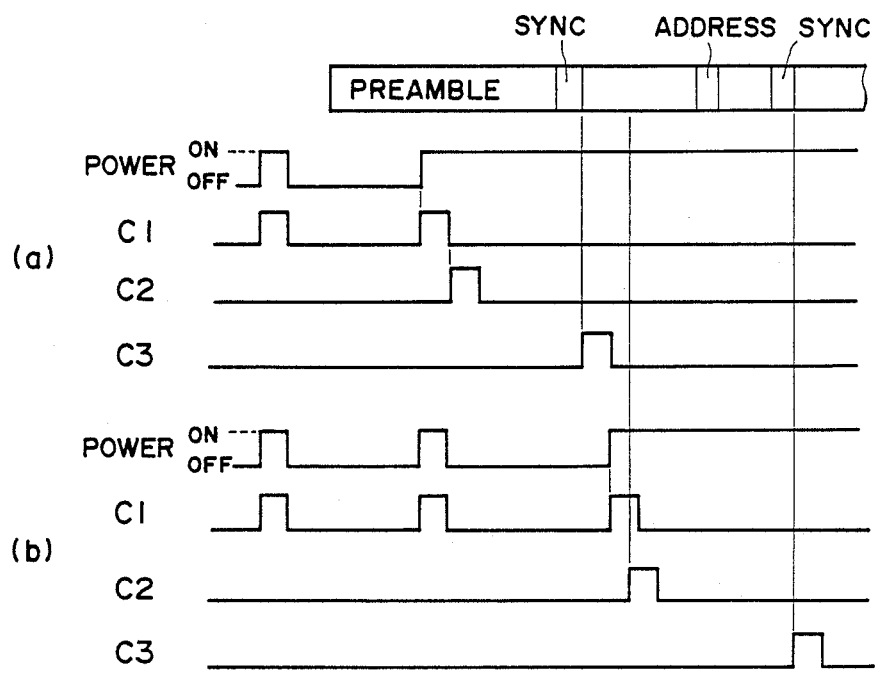
FIG. 2 is a timing diagram useful for the description of the battery saving controller of FIG. 1.

More specifically, battery saving controller 13 supplies control pulses C1, C2 and C3 to the verification circuit 7, sync detector 8 and address detector 9, respectively, as shown in FIG. 2. In response to the generation of each power-supply pulse, a control pulse C1 is supplied to the verification circuit 7 as shown in part (a) of FIG. 2 to permit the preamble detector 5 to search for a preamble. When a preamble is detected by the preamble detector 5, the battery saving controller 13 holds its output at high level to disable the subsequent battery saving operation, terminates the generation of a subsequent control pulse C1 and applies a second control pulse C2 to the sync detector 8 to permit it to search for a subsequent synchronization codeword. When a synchronization codeword is detected, a third control pulse C3 is applied to the address detector 9 and memory 10 to allow bit-by-bit comparison to be made by address detector 9 to search for a match between the user's address and a received address codeword. If there is one, the battery saving disablement is continued, and if there is none, battery saving operation is resumed after a time-out action. On the other hand, if a preamble is not detected in a valid incoming signal during a given active period and an output signal is generated by the verification circuit 7 during a subsequent active period, the subsequent battery saving operation is disabled and a control pulse C2 is applied to the sync detector 8 to allow it to search for a subsequent synchronization codeword as shown in part (b) of FIG. 2. When this synchronization codeword is detected, a control pulse C3 is applied to address detector 9 and address memory 10 to allow detection of a match between the user's address and a received address.

Figure 4:
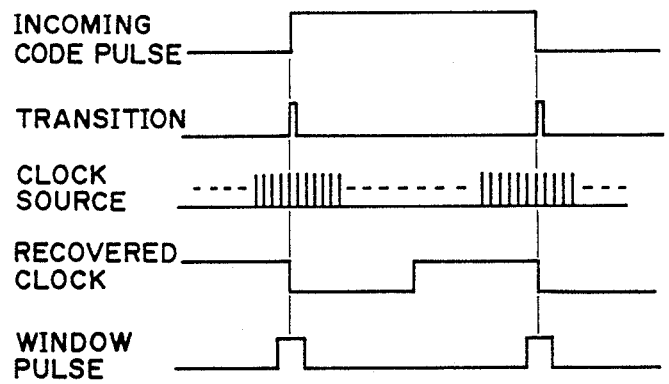
FIG. 4 is a timing diagram associated with the clock recovery and window pulse generation circuit of FIG. 3.
Figure 3:
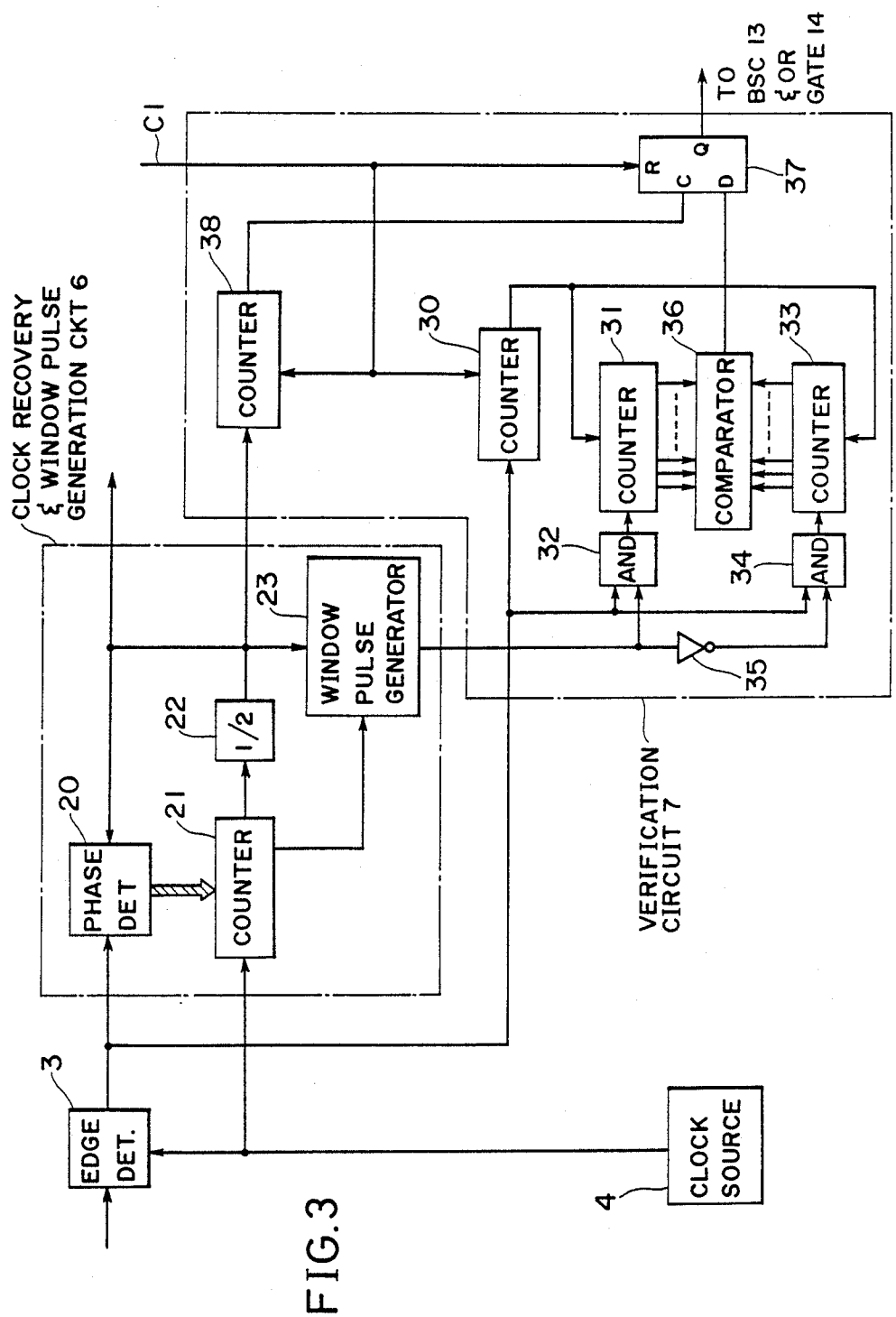
FIG. 3 is a block diagram of the clock recovery and window pulse generation circuit and the verification circuit of FIG. 1.

Referring to FIG. 3, the clock recovery and window pulse generation circuit 6 comprises a phase detector 20, a programmable counter or variable frequency divider 21, a divide-by-2 counter 22 and a window pulse generator 23. Phase detector 20 detects the phase difference between the output of edge detector 3 and the output of divide-by-2 counter 22 and generates an in-phase signal by setting the dividing factor of the frequency divider 21 to N when there is a phase match between the two signals. Phase detector 20 generates a phase advance command signal by resetting the dividing factor to N−1 when the transition pulse generated by the edge detector 3 lags behind the output of divide-by-2 counter 22 or generates a phase retard command signal by resetting it to N+1 when the transition pulse advances with respect to the counter 22 output. Frequency divider 21 provides a count of the locally generated clock pulses and generates an output when the count equals the dividing factor N. Divide-by-2 counter 22 halves the frequency of the output of frequency divider 21. Window pulse generator 23 derives a window pulse from the output of divide-by-2 counter 22 and from the output of an appropriate bit position of the frequency divider 21. Due to the phase-locked loop, the divide-by-2 counter 22 is sychronized with the incoming bit stream to recover its clock timing and the window pulse is synchronized with the recovered clock pulse (FIG. 4.) Therefore, the output of edge detector 3 occurs within the period of each window pulse if the incoming bit stream is a valid paging signal and occurs outside of the window pulse when the incoming signal contains a noise impulse or jitter.

Verification circuit 7 includes a counter 30 that counts transition pulses from edge detector 3 in response to the first control pulse C1 from the battery saving controller 13 and supplies a reset signal to counters 31 and 33 when the count reaches a prescribed value, typically eight. The output of window pulse generator 23 is applied to an AND gate 32 on the one hand and by way of an inverter 35 to an AND gate 34 on the other. Therefore, AND gate 32 is enabled during the presence of a window pulse to pass the output of edge detector 3 to counter 31 and AND gate 34 is enabled during the interval between successive window pulses to pass the edge detector output to counter 33. Thus, counter 31 provides a count of transition pulses occuring within the window pulses and counter 33 provides a count of transition pulses that occur outside the window pulses. The counts provided by counters 31 and 33 are compared against each other by a digital comparator 36 so that it generates a logical-1 output when there is a larger number of transition pulses occurring within the window pulses than the number of those occurring outside the window pulses. The output of comparator 36 is applied to the data input of a D flip-flop 37. A 32-bit counter 38 is connected to the output of divide-by-2 counter 22. Counter 38 is reset in response to the control pulse C1 to start counting the recovered clock pulse to measure the duration in which the front end 2 is active and at the end of the count it supplies an output to the clock input of flip-flop 37 to latch the output of comparator 36. If an incoming bit stream can be treated as a valid paging signal, a greater number of counts will be stored in counter 31 during the prescribed period than the counts stored in counter 33 and a binary 1 is latched in the flip-flop 37. Otherwise, a greater number of counts will be stored in counter 33 than those stored in counter 31 and a binary 0 is latched in the flip-flop 37. The output of flip-flop 37 is connected through OR gate 14 to the power saving circuit 13. If binary 1 is latched in flip-flop 37, the power saving circuit 13 keeps its output at high level to maintain the front end 2 in the active state. Therefore, the battery saving operation can be disabled in response to the reception of a valid incoming signal even though the receiver fails to detect a preamble. As described above, the receiver proceeds to search for a subsequent synchronization codeword to attain word synchronization to permit the address detector 9 to search for a match between a received address and the user's unique codeword.

It is seen from the foregoing that the verification circuit 7 provides a valid indication of the incoming signal with a higher degree of immunity to noise than the degree of immunity of the aforesaid United States patent.

Figure 5:
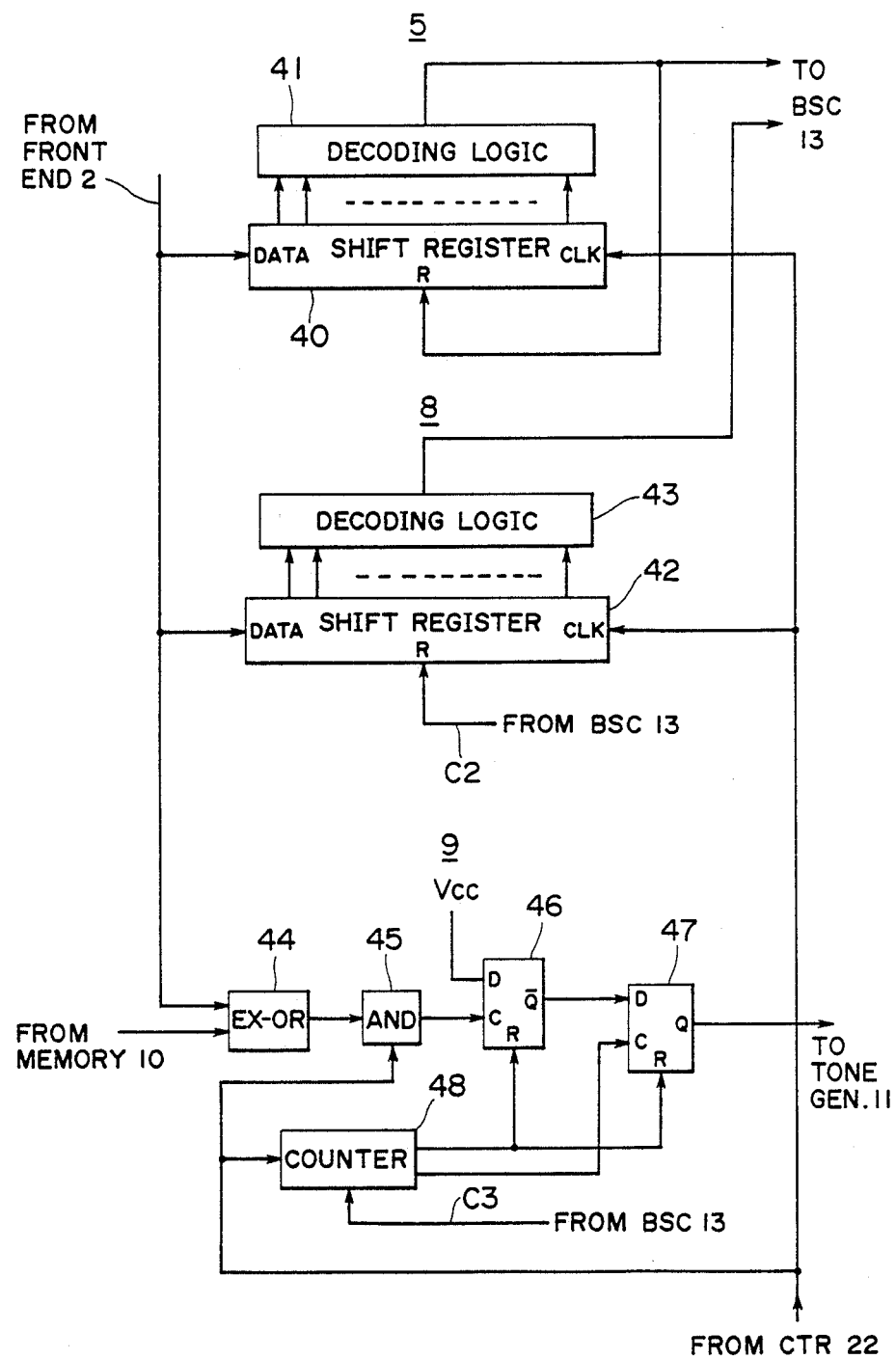
FIG. 5 is a block diagram illustrating the details of the preamble detector, sync detector and address detector of FIG. 1.

For purposes of implementing the present invention, details of preamble detector 5, sync detector 8 and address detector 9 are shown in FIG. 5. Preamble detector 5 comprsies a 32-bit shift register 40 having a data input coupled to the output of front end 2 and a clock input connected to the output of divide-by-2 counter 22 to shift the incoming digital pulses along the shift register stages in response to the recovered clock timing. A decoding logic 41 is formed by a plurality of NOT circuits and an AND gate having inputs coupled directly or by way of the NOT circuits to the shift register stages to form a combination of binary states corresponding to the bit pattern of the preamble to generate an output when the pattern of bits clocked into shift register 40 coincides with the bit pattern of the decoding logic 41. Shift register 40 is reset to all zero's in response to the output of the decoding logic 41.

Sync detector 8 is similarly constructed to the preamble detector 5 with the exception that a decoding logic 43 defines the bit pattern of the synchronization codeword of the paging signal. Shift register 42 is reset in response to the second control pulse C2 which is supplied from the battery saving controller 13 either when a preamble is detected by preamble detector 5 or a valid indication of a received bit stream is given by verification circuit 7. Decoding logic 43 generates an output when the shift register 42 is loaded with bits that coincide with the sync pattern.

Address detector 9 comprises an exclusive-OR gate 44 which combines the outputs of front end 2 and address memory 10 and applies its output to a first input of an AND gate 45 to the second input of which is applied the recovered clock pulse from the divide-by-2 counter 22. AND gate 45 supplies an output to the clock input of a D flip-flop 46 of which the data input is connected to a positive dc supply. The complementary Q output of flip-flop 46 is connected to the data input of a D flip-flop 47. A 32-bit counter 48, which is reset by the control pulse C3 from the battery saving controller 13, counts the recovered clock pulse and supplies a first output to the reset inputs of flip-flops 46 and 47 in response to the first bit of a series of 32 clock pulses which corresponds to the beginning of an address codeword and a second output to the clock input of flip-flop 47 in response to the last bit of the clock pulse sequence which corresponds to the end of the codeword. In operation, exclusive-OR gate 44 makes a bit-by-bit comparison of its inputs so that it generates a binary 0 when a match occurs therebetween and a binary 1 when no match occurs. The binary 1's (mismatch) from the exclusive-OR gate 44 are passed to the clock input of flip-flop 46 to drive its complementary Q output to a logical 0 level, which is latched in the flip-flop 47. If there is a bit-by-bit mismatch between the inputs at the exclusive-OR gate 44, a binary 0 is latched in the flip-flop 47, and therefore, if coincidence exists between all the 32 bits of the compared signals, a binary 1 is latched in the flip-flop 47 to drive the tone generator 11.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A selective calling radio paging receiver adapted to receive a digital bit stream, comprising:

battery saving means for interrupting power supply to a high power drain unit of the receiver at periodic intervals;

clock recovery means for recovering clock pulses from the received bit stream;

window pulse generator means for generating window pulses in synchronism with said clock pulses;

edge detector means for detecting the leading and trailing edges of each pulse in said bit stream and generating a transition pulse in response to the detection of each of the leading and trailing edges;

first counter means for counting said transition pulse which occurs within the period of each of said window pulses;

second counter means for counting said transition pulse which occurs during the interval between said window pulses; and verification means for detecting when the count in said first counter means is greater than the count in said second counter means and causing said battery saving means to cease the interruption of power supply.

2. A selective calling radio paging receiver as claimed in claim 1, further comprising third counter means for counting said transition pulses and resetting said first and second counter means when the count in said third counter means equals a predetermined value.

3. A selective calling radio paging receiver as claimed in claim 2, wherein said verification means comprises;

comparator means for comparing the count in said first counter means with the count in said second counter means and generating an output when the former is greater than the latter;

fourth counter means for counting said recovered clock pulses and generating an output when the count therein equals a predetermined value; and latch means for latching the output of said comparator means in response to the output of said fourth counter means for causing said power saving means to cease the interruption of power supply.

4. A selective calling radio paging receiver as claimed in claim 1, wherein said clock recovery means comprises a phase-locked loop.

5. A selective calling radio paging receiver adapted to receive a digital bit stream containing a preamble followed by a series of blocks each having a synchronization codeword and a series of address codewords, comprising:

battery saving means for interrupting power supply to a high power drain unit of the receiver at periodic intervals;

clock recovery means for recovering clock pulses from said bit stream;

window pulse generator means for generating window pulses in synchronism with said clock pulses;

edge detector means for detecting the leading and trailing edges of each pulse in said bit stream and generating a transition pulse in response to the detection of each of the leading and trailing edges;

first counter means for counting said transition pulse which occurs within the period of each of said window pulses;

second counter means for counting said transition pulse which occurs during the interval between said window pulses;

preamble detector means for detecting said preamble and causing said battery saving means to cease the interruption of power supply;

verification means for detecting when the count in said first counter means is greater than the count in said second counter means and causing said battery saving means to cease the interruption of power supply;

sync detector means for detecting said synchronization codeword either in response to the detection of said preamble by said preamble detector means or in response to the detection of said count in said first counter means as being greater than the count in said second counter means by said verification means; and address detector means for detecting a match between said address codeword and a unique codeword in response to the detection of said synchronization codeword by said sync detector means.

6. A selective calling radio paging receiver as claimed in claim 5, further comprising third counter means for counting said transition pulses and resetting said first and second counter means when the count in said third counter means equals a predetermined value.

7. A selective calling radio paging receiver as claimed in claim 6, wherein said verification means comprises:

comparator means for comparing the count in said first counter means with the count in said second counter means and generating an output when the former is greater than the latter;

fourth counter means for counting said recovered clock pulses and generating an output when the count therein equals a predetermined value; and latch means for latching the output of said comparator means in response to the output of said fourth counter means and causing said battery saving means to cease the interruption of power supply.

8. A selective calling radio paging receiver as claimed in claim 5, wherein said clock recovery means comprises a phase-locked loop.

9. A method for operating a selective calling radio paging receiver adapted to receive a digital bit stream, comprising the steps of:

a) deactivating a high power drain unit of the receiver during a power saving period;

b) activating said unit during a power supply period;

c) recovering clock pulses from the received bit stream during said power supply period:

d) generating window pulses in synchronism with said clock pulses:

e) detecting the leading and trailing edges of each pulse in said bit stream and generating a transition pulse in response to the detection of each of the leading and trailing edges;

f) counting said transition pulse which occurs within the period of each of said window pulses to provide a first count;

g) counting said transition pulse which occurs during the interval between said window pulses to provide a second count;

h) detecting whether said first count is greater than said second count and i) if the answer in the step (h) is negative, repeating the steps (a) to (h) and if the answer in the step (h) is affirmative, continuously activating said high power drain unit.

* * * * *

UNITED STATES PATENT AND TRADEMARK OFFICE
CERTIFICATE OF CORRECTION

PATENT NO. : 4,837,854

DATED : June 6, 1989

INVENTOR(S) : TAKASHI OYAGI ET AL

It is certified that error appears in the above-identified patent and that said Letters Patent is hereby corrected as shown below:

Col. 2, line 62, delete "synchrozation" and insert --synchronization--.

line 64, delete "Cordwords" and insert --Codewords--.

Signed and Sealed this

Thirteenth Day of March, 1990

Attest:

JEFFREY M. SAMUELS

*Attesting Officer*           *Acting Commissioner of Patents and Trademarks*